FIG. 1

United States Patent Office 3,506,901
Patented Apr. 14, 1970

3,506,901
ELECTRONIC SPEED REGULATOR FOR ELECTRIC MOTORS
Claudio Prezzi, Yverdon, and Giovanni Odone, La Rosiaz, Lausanne, Switzerland, assignors to Paillard S.A., Sainte-Croix, Vaud, Switzerland, a company of Switzerland
Filed Mar. 16, 1967, Ser. No. 623,644
Claims priority, application Switzerland, Apr. 4, 1966, 4,949/66
Int. Cl. H02p 5/06
U.S. Cl. 318—314                               5 Claims

ABSTRACT OF THE DISCLOSURE

A highly accurate electronic regulator of the speed of an electric motor, wherein the motor controls a generator producing pulses the duration of which are reversely proportional to the speed of rotation of the motor, said pulses controlling a multivibrator the period of non-stability of which defines pulses of a reference duration produced in synchronism with the first-mentioned pulses. The two series of pulses are compared so as to supply pulses the duration of which are proportional to the difference between the first-mentioned pulses and the reference pulses and which control an electronic switch feeding the motor so as to maintain the latter at a speed determined by the duration of the reference pulses. According to a modification, the reference pulses may in fact be obtained from a remote frequency source with which the motor is to be synchronized.

---

Figure 2:
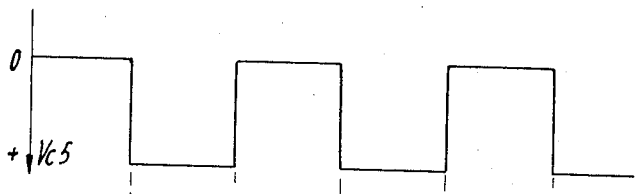

When it is desired to provide constant speed of an electric motor independently of the load modifications in the feed voltage, a centrifugal generator is generally resorted to so as to modify the magnitude of the current feeding the motor. Generally, the regulator acts on a variable resistance inserted in the circuit feeding the motor.

In the case of motors run on low power, which are fed by dry batteries it is preferable to avoid any adjustment of speed through the agency of a resistance, since the latter of necessity absorbs energy at the expense of the life of the battery.

The present invention has for its object to provide a motor speed regulator circuit which provides a very stable adjustment of the speed of an electric motor which reduces to the utmost the electric losses ascribable to said adjustment.

Said invention covers an electronic speed regulator for an electric motor adapted to be used whenever the motor is connected with a supply of energy through the agency of an electronic switch. According to the invention, said regulator includes a generator of pulses the duration of which are reversely proportional to the speed of rotation of the motor, said generator controlling a second generator producing reference pulses of a predetermined duration released in synchronism with those of the first generator, while comparing means supply pulses the duration of which are proportional to the difference in duration of the pulses produced by the two generators, which latter pulses produced by the comparing means control the electronic switch.

The accompanying drawings illustrate diagrammatically and by way of example a preferred embodiment of said invention. In said drawings:

Figure 1:
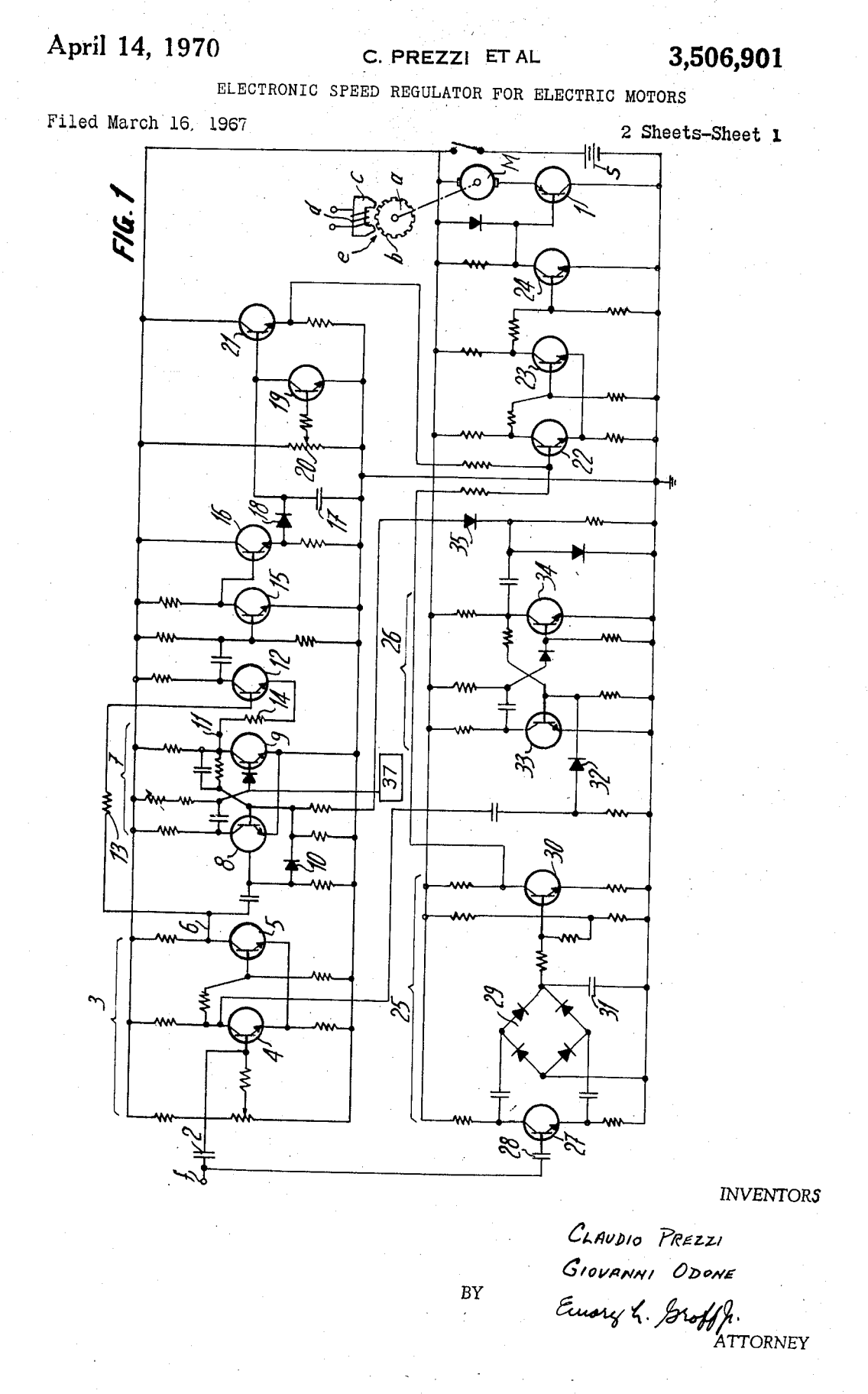

FIG. 1 is a wiring diagram of said embodiment;
FIGS. 2 to 5 are graphs illustrating the operation of the wiring diagram according to FIG. 1.

The motor M the rotary speed of which is to be adjusted is shown on the right-hand side of FIG. 1 in series with an electronic switch 1 constituted by a power transistor. Said motor is fed by a supply S of direct current which may be constituted by a dry battery.

The shaft of the motor carries an iron disc $a$ the periphery of which is provided with teeth $b$ passing in succession during the rotation of the motor M through the gap of a magnetic circuit constituted by a permanent magnet $c$ and round which is formed a winding $d$. Said system acts as a collector $e$ well-known per se, which induces a voltage in the winding $d$ for each passage of a tooth $b$ of the disc $a$ through the gap.

The signal supplied by said collector $e$ is applied to the terminal $f$ which transmits it through the condenser 2 to a Schmitt trigger circuit 3 constituted in the conventional manner by two transistors 4 and 5. Said trigger 3 has for its object to produce at its output 6 a rectangular signal the frequency of which corresponds to that of the more or less sinusoidal signal supplied by the collector $e$ to the terminal $f$. Said output signal designated by $Vc5$ is illustrated in FIG. 2.

The output of the Schmitt trigger is applied to the input of a monostable multivibrator 7 constituted by two transistors 8 and 9, the connection between the trigger circuit and the multivibrator being provided through a diode 10 adapted to bring said multivibrator 7 into its non-stable position at each passage of the positive front edge of the output signal provided by the Schmitt trigger. The potential $Vc9$ at the output 11 of said monostable multivibrator 7 is illustrated in FIG. 3. It is apparent that the duration of non-stability of the multivibrator 7 is slightly shorter than the duration of the pulses supplied by the Schmitt trigger 3 in the case illustrated in FIGS. 2 to 5 which corresponds to a speed of the motor which is substantially equal to the desired speed, because the pulses are shown as having a constant frequency and width, which speed is to be maintained by the adjusting system described.

The output pulses from the multivibrator 7 form reference pulses the duration of which define the desired rotary speed of the motor M. Said duration is constant and may be adjusted by acting in a well-known manner on the time constant of the multivibrator.

Figure 3:
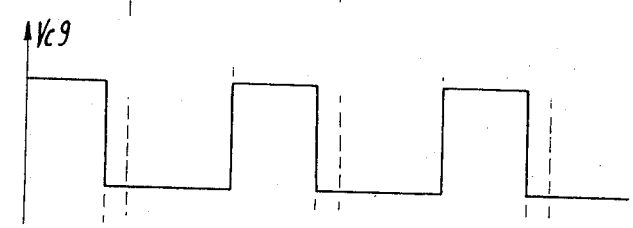

Each output pulse produced by Schmitt trigger 3 is also applied to the base of a transistor 12 through a resistance 13 while the emitter of said transistor 12 receives through a resistance 14 the output signal 11 (FIG. 3) of the multivibrator 7; thus, the transistor 12 is conductive only during the period for which the voltage at the output 6 of Schmitt trigger circuit 3 corresponds to the presence of a pulse illustrated in FIG. 2 and for which the voltage at the output 11 of the multivibrator 7 corresponds to the absence of any positive going pulse illustrated in FIG. 3.

Figure 4:
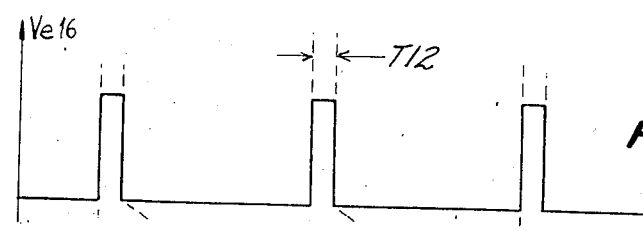

The output of the transistor 12 thus supplies pulses corresponding to the graph illustrated in FIG. 4; in other words, pulses the width of which are equal to the difference between the width of the pulses illustrated in FIGS. 2 and 3. The pulses produced by the transistor 12 are amplified by two transistors 15 and 16 in a manner such that the transistor 16 may be conductive during each pulse of FIG. 4. Said transistor 16 is connected as an emitter follower so that its output impedance is small and ensures a speedy charging of a condenser 17 through a diode 18. When the condenser 17 is completely charged, that is at the end of a pulse illustrated in FIG. 4, said condenser is discharged under almost constant current conditions into a transistor 19. The value of said constant current may be adjusted by means of a potentiometer 20, the selection of said value being such that the duration of discharge is much longer than the duration of charging of the condenser 17.

The time constant corresponding to the charging of the condenser 17 is thus much longer than the duration of the pulses of FIG. 4 while the voltage level to which the condenser 17 may be brought or charged varies with the duration of each pulse of FIG. 4. The discharge current passing out of the condenser 17 is sufficient for ensuring a complete discharge of said condenser between the end of a pulse according to FIG. 4 and the beginning of the next pulse of FIG. 4, provided the motor revolves at the desired speed.

Figure 5:
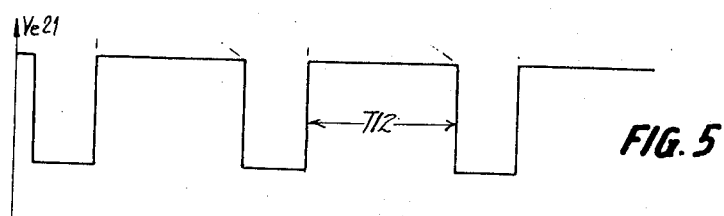

The voltage of the condenser 17 is applied to the input of a transistor 21 connected as an emitter follower and adjusted so as to show a very low conductive threshold. Thus, the transistor 21 becomes conductive immediately after the beginning of a pulse from transistor 12 according to FIG. 4 and it remains practically conductive up to the end of the charging of the condenser 17, which ensures the shaping of the signal received from said condenser. The conductive condition of the transistor 21 is illustrated in FIG. 5 and corresponds to a conductive pulse of a duration T21, said duration being proportional to the duration T12 of the pulses passing out of the transistor 12, but much longer. The power of the pulses produced by the transistor 21 is amplified by a series of three transistors 22, 23, 24, which latter forms a pilot for the electronic switch 1. Thus, the graph of FIG. 5 also illustrates the conductive periods of the electronic switch 1 which controls finally the average voltage applied to the motor M.

It is apparent that, if the speed of the motor M increases, the pulses supplied by the collector $e$ and the corresponding pulses provided at the output 6 of Schmitt trigger 3 and illustrated in FIG. 2 show a much higher frequency and are consequently shorter. Since the duration of the pulses of the multivibrator 7 illustrated in FIG. 3 remains constant, the difference between the output pulses fed by circuits 7 and 3, which difference is shown in FIG. 4, becomes smaller. Thus, the duration T12 of the pulses corresponding to the conductivity of the transistor 12 measures the difference between the actual rotary speed and the desired speed of the motor M. It should be remarked that said difference has been illustrated in a greatly exaggerated manner in FIGS. 2 to 4 so as to allow an easier reading of the drawing. However, the electronic arrangement described hitherto may be easily designed so as to supply comparatively long conductive pulses as illustrated in FIG. 5 when the duration of the pulses T12 is very short, for instance of a magnitude of a few percents of the duration of the pulses supplied by the multivibrator 7. If a very small difference in speed appears, the relative modification in the duration of the pulses T12 is immediately much larger, as also is that of the pulses T21. An immediate correcting action is thus obtained which is very accurate and bestows the motor M with a practically constant rotary speed.

The wiring diagram according to FIG. 1 includes furthermore two auxiliary circuits 25 and 26. The circuit 25 forms a circuit controlling the operative condition of the motor, while the circuit 26 is adapted to prevent synchronization of the regulator for a speed of the motor which is a multiple of the desired speed. The circuit 25 includes a transistor 27 controlled by its base which is connected through a condenser 28 with the terminal $f$. Said transistor 27 feeds a rectifying bridge 29 the output voltage of which controls the base of a transistor 30. The collector of the latter is connected with the base of the amplifier 22 amplifying the signal controlling the electronic switch 1.

The transistor 30 is biased so as to be non-conductive when the rectifier 29 feeds no current, while the load of the condenser 31 fed by said rectifier is zero. In such a case, the voltage of the collector of the transistor 30 which is equal to the voltage of the positive terminal of the supply S is applied to the base of the transistor 22 which becomes thus conductive. This results in the production of a current which causes the electronic switch to become conductive. Thus in the case of the motor being at a standstill fortuitously, for instance at the start, the collector $e$ can supply no signal to the input terminal $f$.

As soon as the circuit system illustrated in FIG. 1 is energized by the supply S, the electronic switch 1 closes under the action of the circuit 25. The motor M starts consequently and a signal is then fed to the terminal $f$ which positively charges the condenser 31 and makes the transistor 30 conductive. The collector of the latter is therefore grounded so that the base of the transistor 22 of the amplifier 22, 23, 24 is biased henceforward by the proper amount required for normal operation. The delaying circuit 26 is controlled by the positive alternation of the signal passing out of the collector of the transistor 4 forming part of Schmitt trigger 3, said signal being transmitted by a diode 32 adapted to render the transistor 33 conductive each time the potential Vc5 illustrated in FIG. 2 is shifted out of its condition "0" into its condition "+," that is at the end of each pulse of the collector of the transistor 5.

The transistor 33 is connected with a transistor 34 so as to form a monostable multivibrator the period if instability of which is short when compared with that of the multivibrator 7. The negative alternation of the output signal of the transistor 34 of the circuit 26 is fed through the diode 35 to the base of the transistor 8 of the multivibrator 7 so as to return the latter into its stable condition in case it is not already again in this condition. Thus, the circuit 26 prevents two successive pulses produced by the collector and Schmitt trigger at 6 (FIG. 2) from acting during a single pulse of the multivibrator 7 (FIG. 3). This cuts out the risk of the regulator acting on the motor so as to maintain it at a speed equal to twice or three times the desired value. Such a faulty operation might in fact appear in the absence of such a circuit 26 in certain applications where it is possible to produce a sudden very large modification of the desired speed. Thus, for instance, in an electrically driven kinematographic camera, it is possible for the operator to take a series of views at a speed of 64 pictures per second and then to suddenly return, without any interruption in the shot, to the normal speed of 16 pictures per second, with the camera motor speed controlled with the regulator circuit of the invention.

Obviously numerous modifications may be made to the circuit described and in particular the comparison between the input signal and output signal of the multivibrator 7 may be obtained by an arrangement including a resistance circuit wherein the output signal of the multivibrator is added with a reversed polarity to the input signal of the latter.

The wiring diagram illustrated is particularly suitable for the adjustment in speed of a motor in synchronism with an electric signal illustrating for instance the speed of a movable part. It is well-known that such a synchronization is of a considerable interest in the case of the projection of sound films when the sound is recorded by an apparatus independent of the projector or camera, for instance by a magnetophone. To obtain perfect synchronization it is sufficient to apply the synchronizing pulses to the base of the transistor 9 of the multivibrator 7 through control means similar to the circuit 26 so that the synchronizing pulses produce consequently a return of the multivibrator 7 into its stable condition. Thus, the duration of the pulses illustrated in FIG. 4 measures no longer the difference between the actual speed of the motor and a constant desired speed but the difference between the actual speed and the desired synchronous speed, which latter may be variable. Since the pulses supplied by the collector $e$ are functions of the angular speed of the motor, it is possible to obtain a synchronization which allows setting accurately in step the movable part and the motor.

The collector $e$ may of course be constituted by any generator adapted to supply pulses of a frequency and/or duration proportional to the speed of rotation of the motor. In particular, it is possible to resort to a generator relying on photo-electric means.

We claim:

1. An electronic speed regulator for an electric motor connected to be energized by a current supply source through an electronic switch comprising; a first pulse generator means connected with said motor for producing pulses having a duration inversely proportional to the speed of rotation of the motor; a second pulse generator connected to be triggered by the pulses from said first pulse generator means for producing, in synchronization with the pulses from the first pulse generator means, reference pulses of a predetermined duration proportional to the desired speed of rotation of the motor; comparator means connected to receive the pulses from said first pulse generator means and said second pulse generator and to produce difference pulses having a duration equal to the difference in the durations of the pulses proportional to the speed of rotation of the motor and the reference pulses; and a duration amplifier connected to amplify the duration of said difference pulses and to operate the electronic switch with the duration of such pulses, whereby the current from the supply source to the motor is pulsed by the duration of the amplified difference pulses to adjust the current to the motor with each pulse for the instantaneous speed of the motor to maintain the motor at a speed of rotation predetermined by said reference pulses.

2. An electronic speed regulator as set forth in claim 1, in which said second pulse generator is a monostable multivibrator, said first pulse generator means including a pulse producing pick-up device integrated with the rotation of the motor, and said comparator means includes a resistance circuit in which the reference pulses from said second pulse generator are added in opposite polarity to the pulses from said first pulse generator means.

3. An electronic speed regulator as set forth in claim 2 in which said monostable multivibrator has a stable state and an unstable state, and a delayed action circuit connected to said multivibrator and said first pulse generator means and operative to return said multivibrator to the stable state if it is in the unstable state for a certain length of time after the termination of pulses from said pick-up device.

4. An electronic speed regulator as set forth in claim 2 including another circuit connected to said pulse producing pick-up device and responsive to the pulses therefrom and thus the rotation of the motor, said another circuit having an output connected to the electronic switch and operative to supply a signal in the event of stoppage of the motor to render the electronic switch conductive to start the motor.

5. An electronic speed regulator as set forth in claim 2 in which said multivibrator includes an input terminal for a remote input, and a remote external frequency source operating at a frequency to which the speed of the motor is to be adjusted adapted for connection with said input terminal to synchronize the speed of rotation of the motor with said remote external frequency source.

References Cited

UNITED STATES PATENTS

| 3,152,267 | 10/1964 | Clapper | 307—267 X |
| 3,241,023 | 3/1966 | Eby | 318—314 |
| 3,257,595 | 6/1966 | Polakowski | 318—314 |
| 3,328,602 | 6/1967 | Taylor | 307—267 X |
| 3,340,951 | 9/1967 | Vitt | 318—314 X |

FOREIGN PATENTS 1,077,307   3/1960   Germany.

ORIS L. RADER, Primary Examiner

R. J. HICKEY, Assistant Examiner

U.S. Cl. X.R.

318—341